(12) United States Patent
Miao et al.

(10) Patent No.: US 7,782,829 B2
(45) Date of Patent: Aug. 24, 2010

(54) ENERGY-EFFICIENT LINK ADAPTATION AND RESOURCE ALLOCATION FOR WIRELESS OFDMA SYSTEMS

(75) Inventors: Guowang Miao, Atlanta, GA (US); Nageen Himayat, Freemont, CA (US)

(73) Assignee: Intel Corporation, Santa Clara, CA (US)

(*) Notice: Subject to any disclaimer, the term of this patent is extended or adjusted under 35 U.S.C. 154(b) by 102 days.

(21) Appl. No.: 12/143,809

(22) Filed: Jun. 22, 2008

(65) Prior Publication Data
US 2009/0316805 A1    Dec. 24, 2009

(51) Int. Cl.
*H04B 7/208* (2006.01)
(52) U.S. Cl. ............... 370/344; 370/232; 370/330; 370/319
(58) Field of Classification Search ............. 370/343, 370/344, 319, 232
See application file for complete search history.

(56) References Cited

U.S. PATENT DOCUMENTS

| | | | |
|---|---|---|---|
| 2006/0028984 A1* | 2/2006 | Wu et al. | 370/230 |
| 2008/0076438 A1* | 3/2008 | Chang et al. | 455/452.2 |
| 2008/0107056 A1* | 5/2008 | Choi et al. | 370/311 |
| 2008/0165874 A1* | 7/2008 | Steele et al. | 375/261 |

* cited by examiner

Primary Examiner—Ian N Moore
Assistant Examiner—Matthew Hopkins
(74) Attorney, Agent, or Firm—Carrie A. Boone, P.C.

(57) ABSTRACT

An energy-efficient framework for active transmission in OFDMA-based long-range wireless networks is disclosed. This frame-work is based on using energy-aware metrics for resource allocation and link adaptation. By casting the optimal energy-efficient resource allocation problem as utility-based optimization problem, low-complexity utility-based resource allocation schemes developed here can be applied to reduce the complexity of resource allocation decisions.

11 Claims, 17 Drawing Sheets

ENERGY-EFFICIENT LINK ADAPTATION AND RESOURCE ALLOCATION FOR WIRELESS OFDMA SYSTEMS

TECHNICAL FIELD

This application relates to energy consumption in a wireless system and, more particularly, to a framework for link adaptation and resource allocation.

BACKGROUND

Power consumption for wireless communications will comprise a significant portion of platform power for small form-factor devices such as mobile internet devices/handhelds, etc. Energy-efficient protocols, therefore, are important to prolong the limited battery life of such devices.

While several MAC layer protocols exist for maximizing the sleep and idle modes to save battery power, optimizing the energy efficiency of transmissions in the active (transmitting or receiving) mode is also important to prolong the talk-time available to mobile devices. Thus far, this optimization problem has been studied largely in the context of short-range ad-hoc or sensor networks. There has been limited work on energy-efficient link adaptation and resource allocation for long-range, cellular type networks.

Additionally, the application of minimal energy link adaptation and resource allocation schemes to orthogonal frequency division multiple access (OFDMA) based wireless networks, such as WiMAX, has not been addressed in the literature. (WiMAX is short for worldwide interoperability for microwave access—the group promoting the IEEE 802.16 wireless broadband standard.)

In the prior art, a large body of work focuses on short-range communication systems, like sensor networks, where circuit energy dominates the energy consumption during the working lifetime of a node. Here, it is desirable to always use the highest supported modulation rate to complete transmissions as soon as possible. Additionally, for minimal circuit energy consumption, traffic transmissions may also be managed to maximize the sleep period. In long-range networks like cellular networks, the transmission energy dominates the total energy consumption. In order to minimize the transmission energy, the lowest modulation is preferred for such systems, while accommodating the delay constraint. Based on a similar idea, one prior art proposal involves a lazy packet scheduling scheme. This scheme minimizes the overall transmit energy, by extending the transmission time of each packet to be as long as permitted by the buffer backlog status.

In prior art energy-efficient link adaptation, considering the trade-offs between transmit energy and circuit energy consumption is described, but the treatment does not address multi-channel modulations such as OFDMA. Besides optimizing link transmissions, recent research also considers network optimization for energy efficiency. For example, a distributed power control approach is proposed for the uplink transmission of a code-division multiple access (CDMA) system. Additionally, joint user-centric and network-centric optimizations are considered to maximize the number of bits transmitted per joule.

Thus, there is a continuing need for energy-efficient link adaptation for wireless OFDMA systems.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, an energy-efficient communication framework for long-range wireless OFDMA systems is disclosed. In particular, cellular networks are considered, but the techniques are general enough that they may be applicable to alternate longer range OFDMA-based wireless topologies.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. The following detailed description is, therefore, not to be construed in a limiting sense, as the scope of the present invention is defined by the claims.

Figure 1:
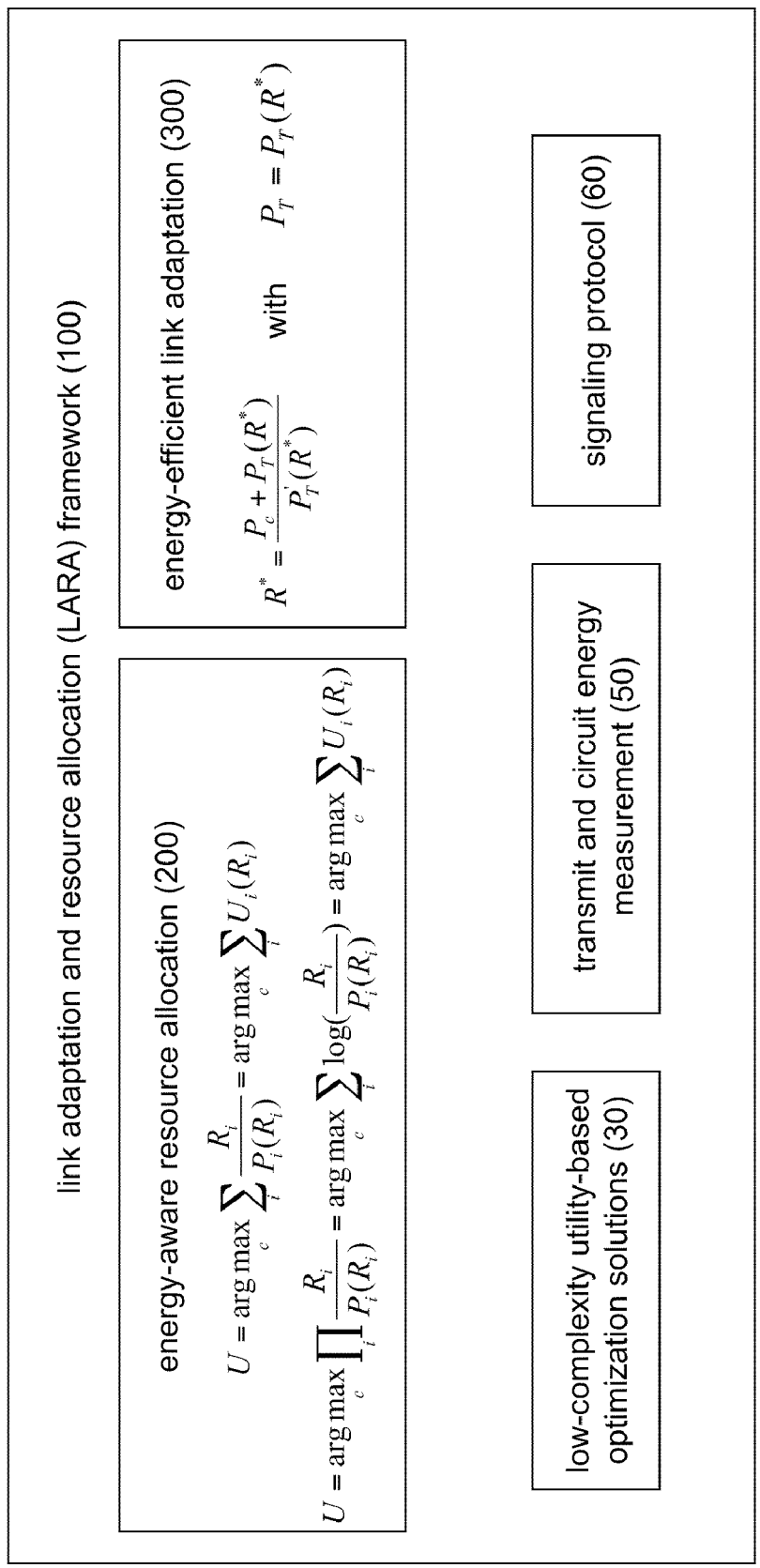
FIG. 1 is a block diagram of a link adaptation and resource allocation (LARA) framework, according to some embodiments.

FIG. 1 is a block diagram depicting a link adaptation and resource allocation (LARA) framework 100, according to some embodiments. The LARA framework 100 includes energy-aware resource allocation 200, based on energy-efficient metrics, and energy-efficient link adaptation schemes 300, which are discussed in detail, below. The LARA framework 100 further includes support functions to enhance the resource allocation 200 and link adaptation schemes 300, including low-complexity utility-based optimization solutions 30, transmit and circuit measurement techniques 50, and a signaling protocol 60.

In the LARA framework 100, the energy-aware resource allocation metrics 200, such as throughput-per-joule metrics, are used to optimally allocate the OFDMA resources across users in a cellular network. The optimal energy-efficient resource allocation problem is rendered complex by the need for simultaneous, per-frame allocation of multiple OFDMA sub-channels across users. Additionally, the metrics 200 depend not only on the rate but also on the rate-dependent power used to transmit the signal. Typically, the channel gains across the OFDMA sub-channels are different. Therefore, the exact sub-channel location has an effect on the optimization metric.

In some embodiments, the LARA framework 100 provides a general approach to solving resource allocation problems. Given the difficulty of the OFDMA resource allocation, the LARA framework 100 formulates energy-aware metrics as part of a "utility" based framework. The "utility" captures the value of assigning a resource to a user, in this case, the additional "throughput per joule" available. Accordingly, the utility-based optimization solutions 30, developed for OFDMA systems, can be directly applied to a system. A utility-based formulation is also useful for other utility-based quality of service-aware (QoS-aware) resource allocation schemes. The LARA framework 100 can further take advantage of complexity reduction techniques for utility-based optimization described herein.

Further simplification is also possible for the case of slowly varying, flat-fading OFDMA channels (or, equivalently, a system using randomized sub-channels), where the optimization solution depends on the number of sub-channels allocated rather than their specific locations.

The LARA framework 100 further includes the energy-efficient link adaptation schemes 300. The energy-aware utility metric per subscriber depends on the minimal energy rate and power setting of each link. Accordingly, the energy-efficient link adaptation schemes 300 are suited for a multi-channel OFDMA system. In particular, it is shown that the optimal rate and power setting per link depends on the number of sub-channel allocated for the link.

In some embodiments, using the transmit and circuit energy measurement 50, the LARA framework 100 explicitly accounts for both the transmit energy and circuit energy consumption. Circuit energy can play an important role in long-range communications.

The simple signaling protocol 60 of the LARA framework 100 enables energy-efficient resource allocation in a wireless system, in some embodiments. The signaling protocol 60 allows for communicating the energy consumption profiles of clients to a base-station (BS) performing resource allocation decisions.

Energy-Efficient Link Adaptation 300

The optimal rate and power allocation per link for minimum energy transmission in active mode may be derived through the following optimization problem. The optimal transmission rate, R*, may be given by:

$$R^* = \underset{R}{\operatorname{argmin}} E(R) = \underset{R}{\operatorname{argmin}} \frac{P(R)}{R} = \underset{R}{\operatorname{argmin}} \frac{P_c + P_T(R)}{R}$$

where R denotes the transmission rate, E(R) is the energy consumed at the transmission rate, P(R) is the power consumed at the transmission rate, $P_C$ is the electronic power consumed, and $P_T(R)$ is the transmit power at transmission rate, R.

In the above equation, the LARA framework 100 considers transmit power to comprise of both power consumed due to transmitting at a specific rate as well as power consumed in the active electronics. This optimization problem has been considered in the prior art for the case where no electronics power is assumed, with the conclusion that the lowest modulation rate possible should always be used.

In the LARA framework 100, on the other hand, the electronic power wasted is explicitly considered. In some embodiments, it can be shown that there is an optimal transmission point for minimal energy transmission, and it is not always best to transmit at the lowest rate.

For example, a subscriber (client) station transmitting to a base station is located a certain distance from the station. Certain resources are allocated to the subscriber station. The power used to transmit a signal to the base station has two different components, the transmit power, $P_T(R)$, and the circuit power, $P_C$. If the subscriber station is close to the base station, the transmit power would be lower than if the transmission is longer range. Accordingly, the circuit power, $P_C$, would constitute a larger portion of the total power during short-range transmissions than when the subscriber station is far from the base station. In such a case, an optimal transmission scenario may be to transmit as soon as possible and shut down. For long-range transmissions, the circuit power would be negligible and the transmit power dominant. In that case, an optimal transmission would be one where the subscriber station transmits for a longer time.

It can be shown that the solution to the above optimization problem exists and is given by:

$$R^* = \frac{P_c + P_T(R^*)}{P'_T(R^*)} \text{ with } P_T = P_T(R^*) \quad (1)$$

where $P'_T(R)$ is the derivative of the transmit power at the transmission rate.

The solution to the above equation may be derived via numerical methods. The tables for optimal energy-efficient rates and corresponding power may be computed off-line and used for transmission.

Example Embodiment

Uncoded QAM

An example embodiment is described for the case of un-coded quadrature amplitude modulation (QAM) transmissions. The transmit power and rate relationships for un-coded QAM, for an additive white Gaussian noise (AWGN) channel, may be derived through knowledge of the target bit error rate (BER) and the corresponding received signal-to-noise ratio. Although the results are presented for the AWGN case, they are equally applicable for the case of fading channels as well if the instantaneous channel gain can be estimated. This is a reasonable assumption for slowly fading channels. Further, for OFDMA signals, the results are derived on a per-sub-channel basis. Flat fading or randomized permutations are assumed for multi-channel results, although the results may be extended to frequency-selective cases, in some embodiments.

Figure 2:
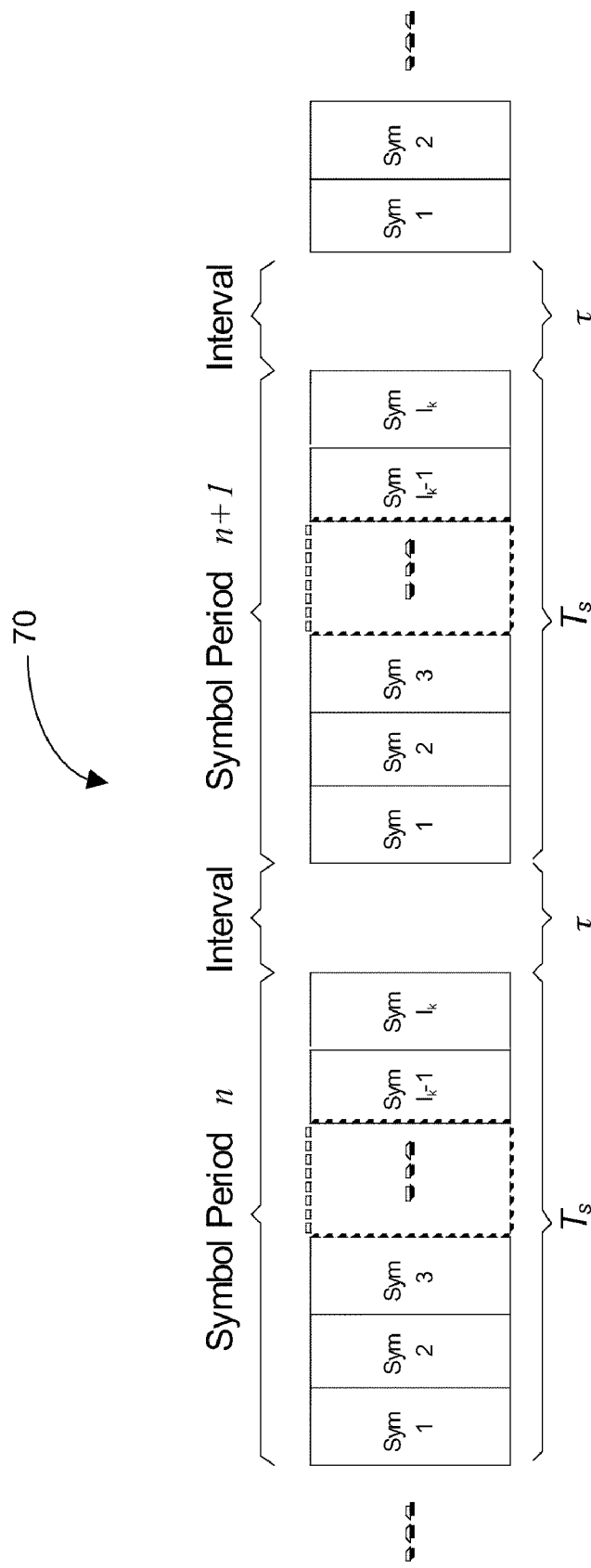
FIG. 2 is a frame structure for transmission used by the LARA framework of FIG. 1, according to some embodiments.

FIG. 2 further clarifies the notation. FIG. 2 depicts a frame structure 70 for transmission, according to some embodiments. Each symbol may comprise multiple-channels, such as in an OFDMA system. Each symbol period, n, includes $l_k$ channels, with a time interval, $\tau$, between each symbol period.

The transmit power for un-coded QAM, given a certain desired BER requirement, is given by the following formula:

$$P_T(R) = |C_i| \frac{2\left(1 - 2^{\frac{R(T_s+\tau)}{|C_i|l_k}}\right)\ln(5P_e)\sigma^2 WG_n}{3g_i} \frac{T_s}{T_s+\tau} = A(1 - 2^{BR})$$

where $C_i$ is the channel allocated to user, i, $P_e$ is the probability of error, $\sigma^2$ is the thermal noise power, $T_s$ is the symbol period (as shown in FIG. 2), W is the bandwidth, $G_n$ is the receiver noise figure, $\tau$ is the interval between symbol periods, $g_i$ is the channel gain of user i, which includes path loss, shadow fading, and fast fading. Constants A and B are used in the above expression to capture some parameters, such that a clear relation between $P_T(R)$ and R can be seen.

The optimal rate and power may be further derived, as given by the following equation:

$$M^* = 2^{\frac{R^*(T_s+\tau)}{|C_i|l_k}}$$

where M* is the optimum modulation rate for R*, the optimum transmission rate.

Performance of Energy-Efficient Link Adaptation for Uncoded QAM

Figure 3A:
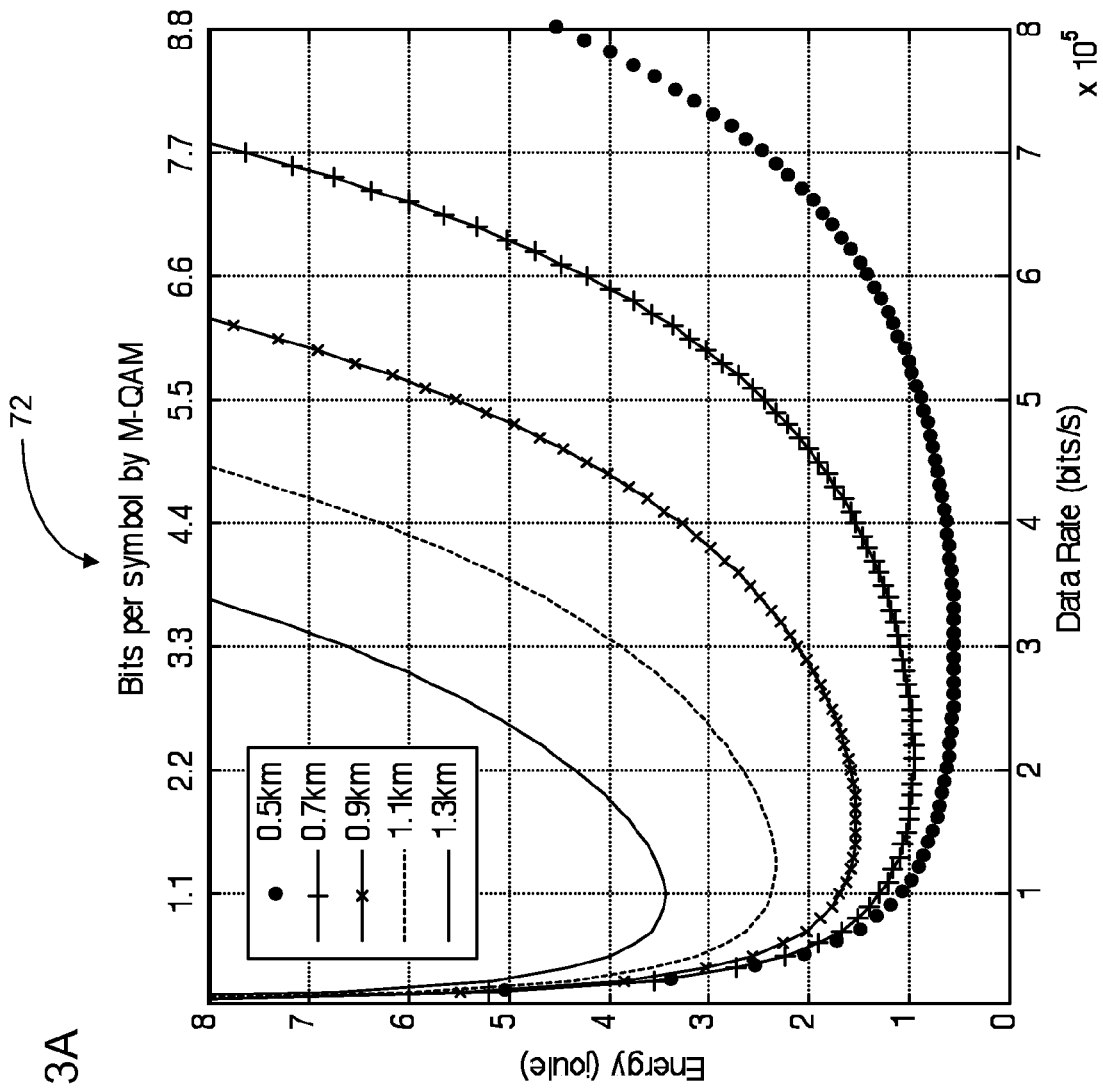
FIGS. 3A and 3B are two graphs depicting a relationship of energy, distance, modulation, and data rate for transmitting data, according to some embodiments.
Figure 3B:
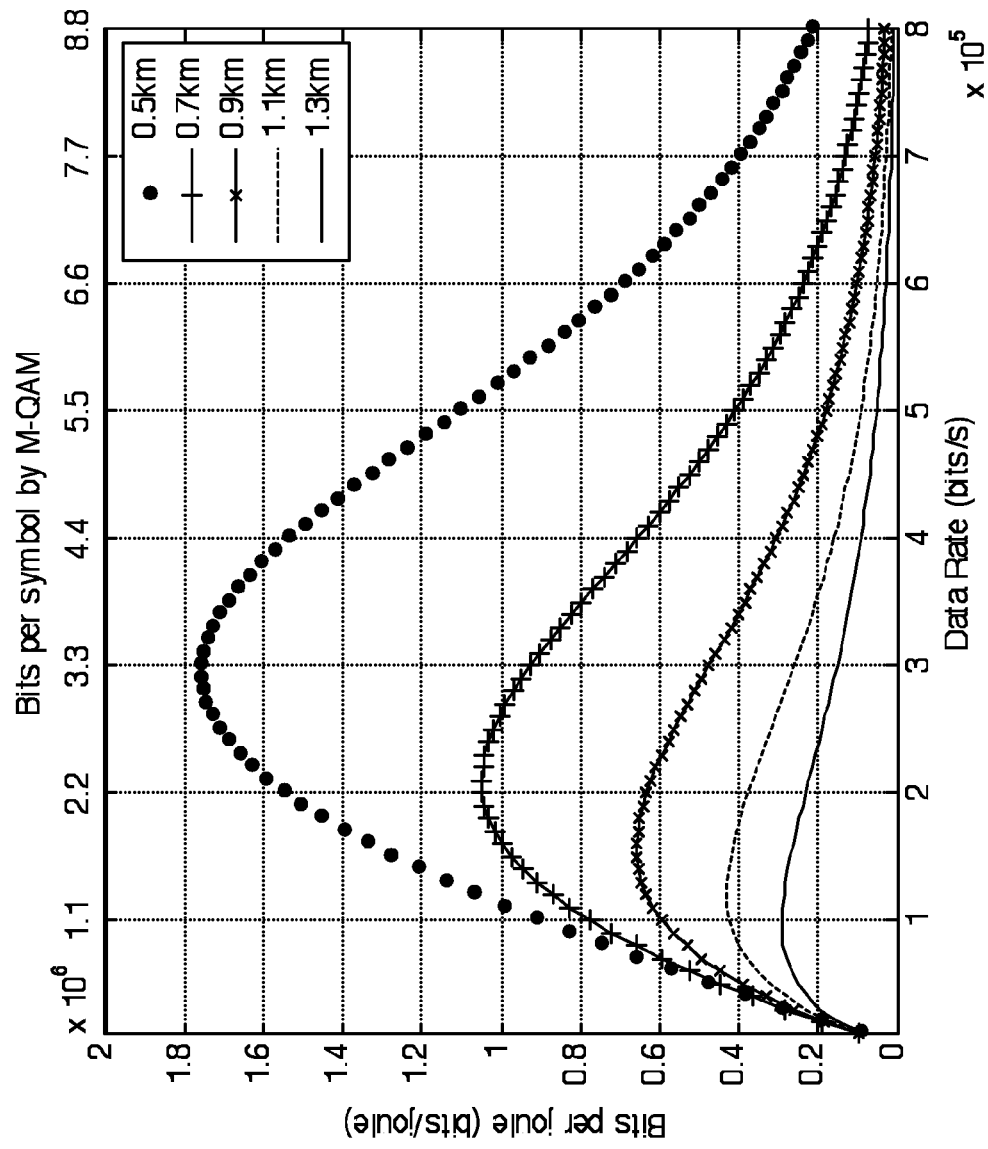

FIGS. 3A and 3B illustrate the trade-offs involved for energy-efficient link adaptation. The graph 72 (FIG. 3A) and the graph 74 (FIG. 3B) illustrate the relationship of energy, distance, modulation, and data rate for transmitting 1 megabyte (MB) of data. A fixed sub-channel assignment is assumed. Both energy and bits per joule metrics are plotted as a function of the data rate and modulation scheme for varying signal power levels (dependent on the distance from the base-station).

Figure 4A:
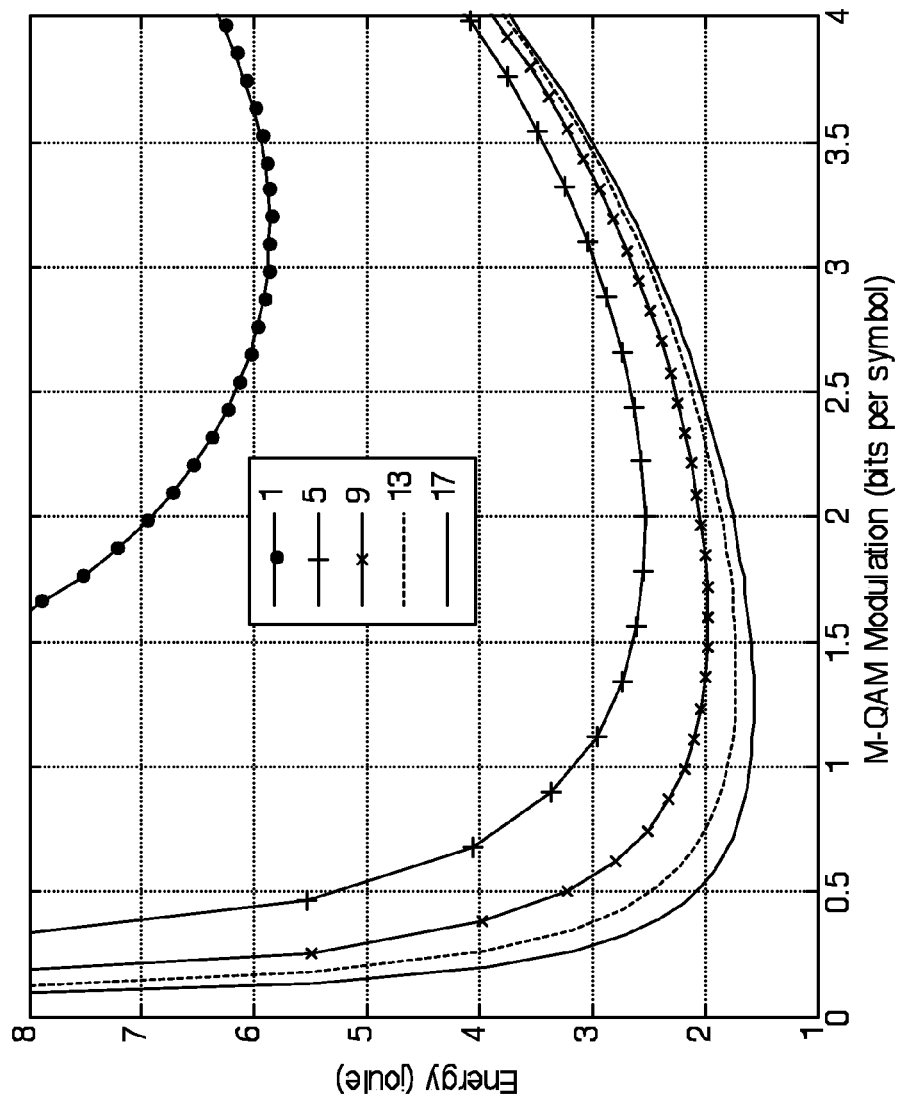
FIGS. 4A and 4B are two graphs depicting a relationship of energy, sub-channel assignment, modulation, and data rate for transmitting data, according to some embodiments.
Figure 4B:
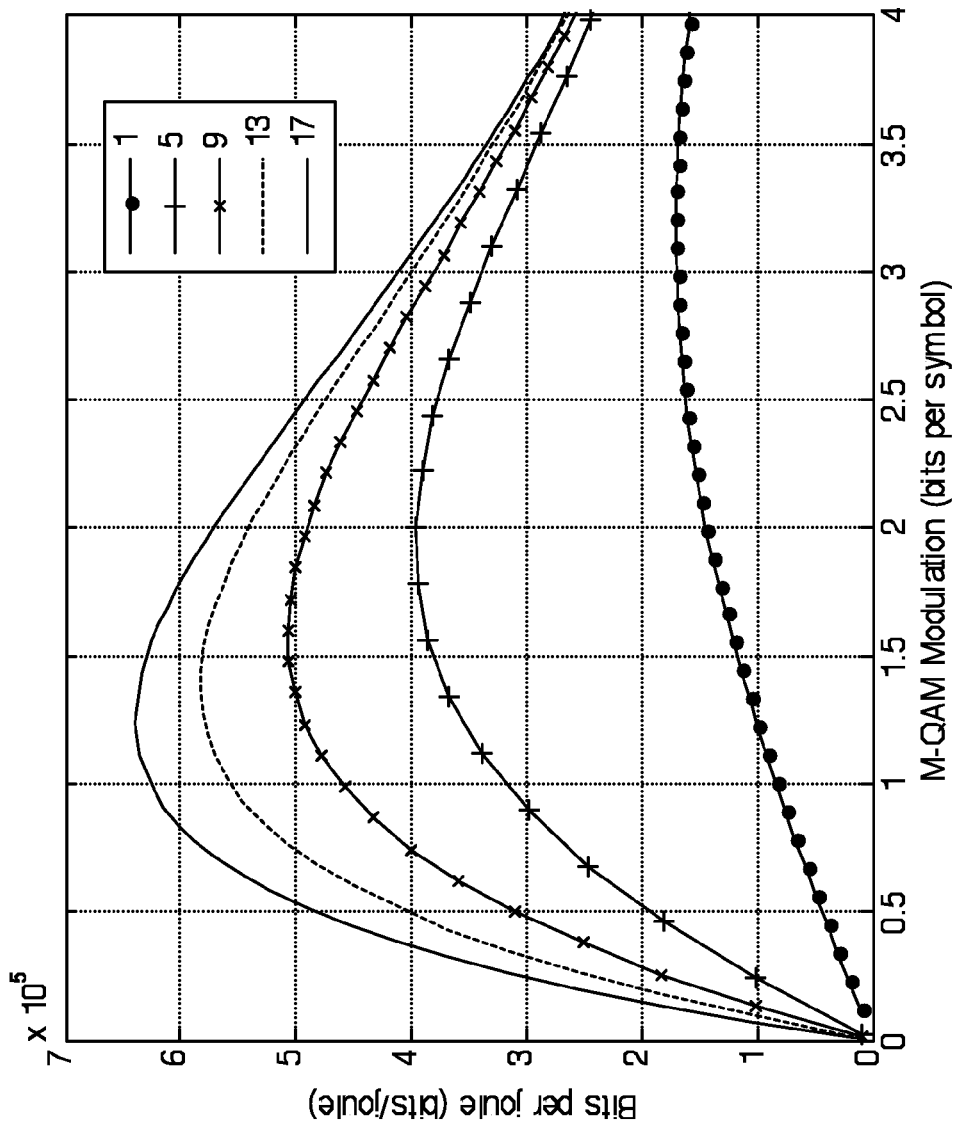

FIGS. 4A and 4B are graphs 76, 78, respectively, illustrating the relationship of energy, sub-channel assignment, modulation, and data rate for transmitting 1 MB of data. Both energy and bits per joule metric are plotted as a function of the data rate and modulation scheme for different sub-channels allocated.

In some embodiments, the trade-offs shown in FIGS. 3A, 3B, 4A, and 4B suggest the following guidelines for energy-efficient link adaptation. If the sub-channel assignment is fixed, then the LARA framework 100 employs minimal energy transmission using a higher rate (higher modulation levels), with increasing channel power gain. Here, the bits transmitted per joule will always increase with increasing channel power gain. If, however, the channel assignment is not fixed, then the LARA framework 100 uses a lower modulation level, with an increasing sub-channel assignment. Here, the bits transmitted per joule of energy will increase as the number of sub-channels increases. This feature is specific to a multi-carrier OFDMA system.

Figure 5:
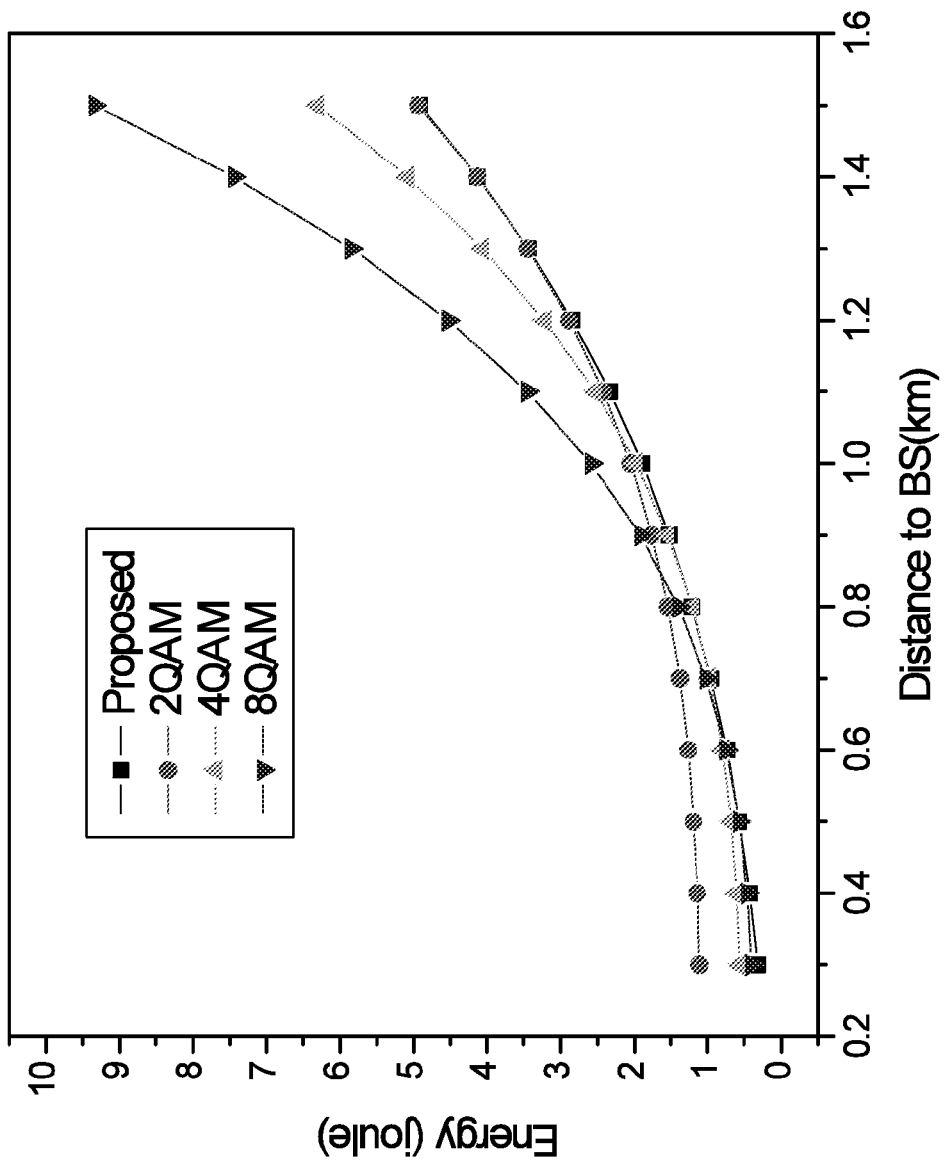
FIG. 5 is a graph showing energy consumed for transmitting data with optimal link adaptation using fixed modulation, according to some embodiments.
Figure 6:
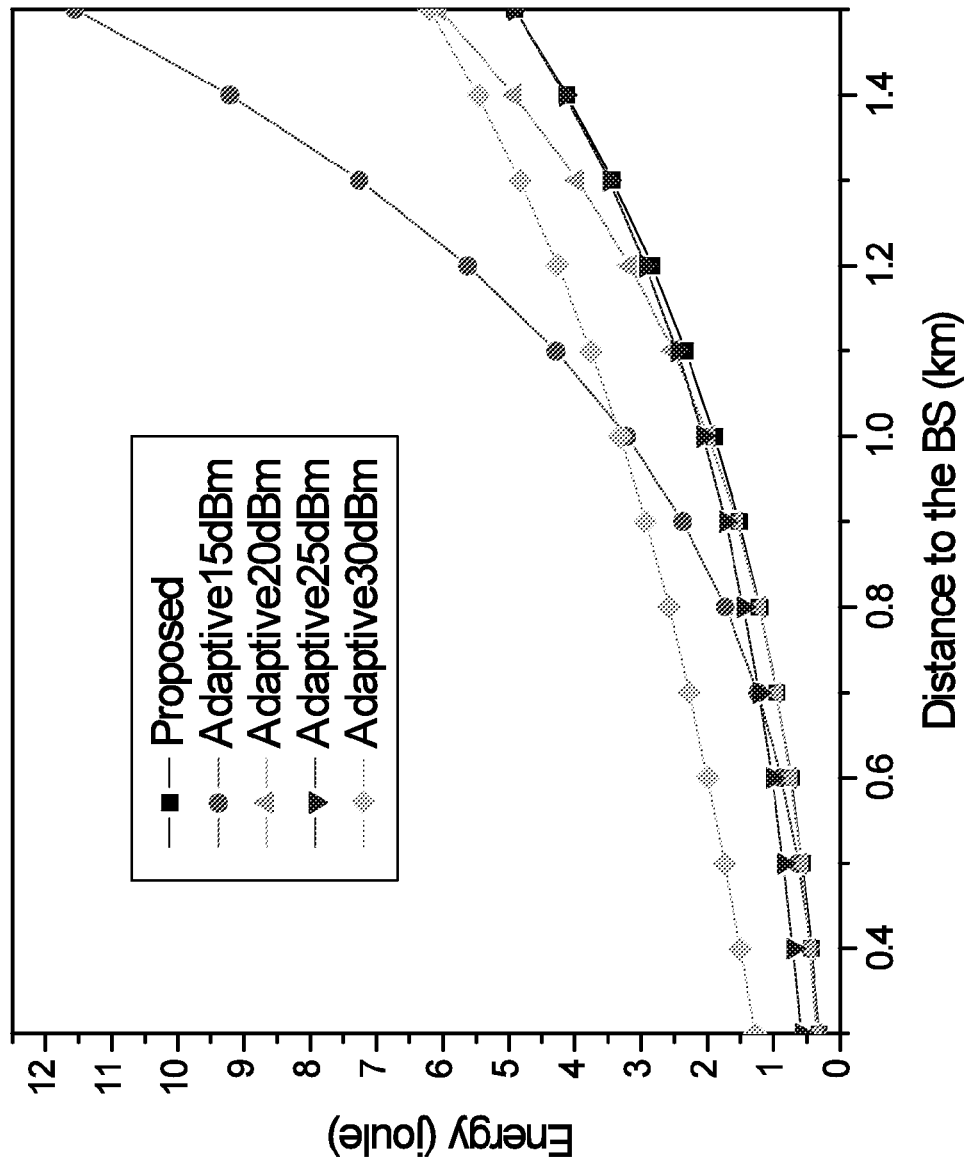
FIG. 6 is a graph showing energy consumed for transmitting data with optimal link adaptation using adaptive modulation, according to some embodiments.

Graphs 80 and 82 in FIGS. 5 and 6, respectively, depict performance results of the energy-efficient link adaptation scheme 300 of the LARA framework 100, according to some embodiments. The graphs 80, 82 illustrate that significant energy savings are possible. The improvements are observed, both for the fixed and adaptive modulation cases. The graph 80 (FIG. 5) illustrates the energy consumed for transmitting 1 MB of data with optimal link adaptation using fixed modulation. The energy-efficient link adaptation scheme 300 chooses the optimal power allocation for all distances, in some embodiments. The proposed solution is compared to 2 QAM, 4 QAM, and 8 QAM implementations.

FIG. 6 illustrates the energy consumed for transmitting 1 MB of data with the energy-efficient link adaptation scheme 300 using adaptive modulation. The energy-efficient scheme 300 chooses the optimal power allocation for all distances, in some embodiments. The proposed solution is compared to adaptive 10 decibel meters (dBm), adaptive 20 dBm, adaptive 25 dBm, and adaptive 30 dBm.

Extension to Coded and Discrete Modulation

Finding the optimal rate and transmit power for un-coded QAM is relatively easy, as closed form expressions for relating the error performance of these schemes with signal-to-noise ratio measures exist. For coded transmissions, this relationship is derived through simulation modeling of the communication system and subsequent measurement of the error rate performance with respect to transmit power, in some embodiments. Suitable error bounds, such as the Chernoff bound, cut-off rates, and relevant link-to-system mapping work may also be used. Tables with a dense set of parameters may be computed off-line and the optimal link parameter settings may be derived through numerical methods.

Energy-Efficient Resource Allocation 200

In addition to considering the optimal power per link, it is also useful to consider how the resources in the network may be allocated optimally to minimize the overall active energy consumption in the network. In some embodiments, the LARA framework 100 employs energy-efficient resource allocation strategies 200 for OFDMA systems. The energy-efficient resource allocation metrics 200 are based on maximizing the overall throughput per joule of energy in a network. Several energy aware metrics may be used to achieve this goal. Examples include the sum throughput per joule across users as well as the proportional fairness metric, in which the product of the throughput-per-joule (or, equivalently, the log sum) across users is considered. The throughput-per-joule metric has been considered for power control in prior art code division multiple access (CDMA) networks, but has not been used for OFDMA systems. These metrics may be thought of as "utility-based" metrics.

Figure 7A:
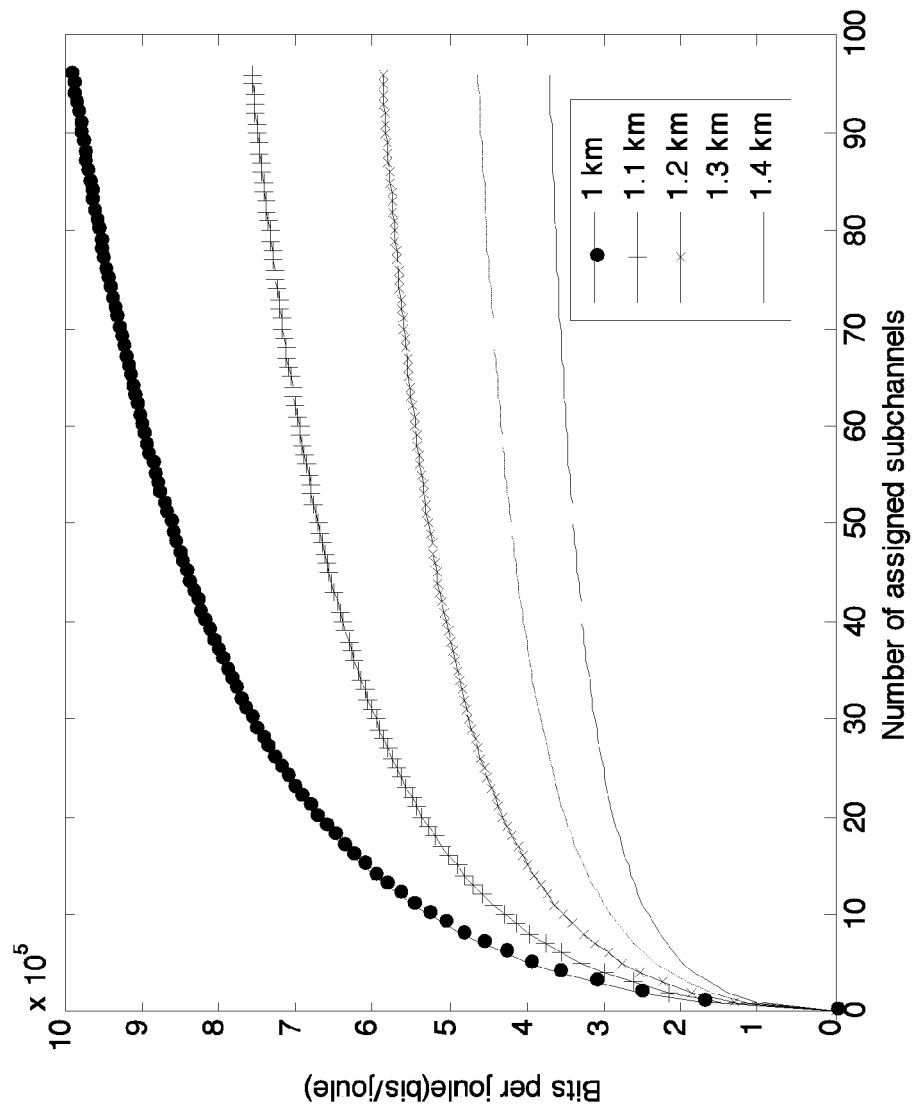
FIGS. 7A and 7B are two graphs depicting a relationship of bits-per-joule capacity versus number of sub-channels, according to some embodiments.
Figure 7B:
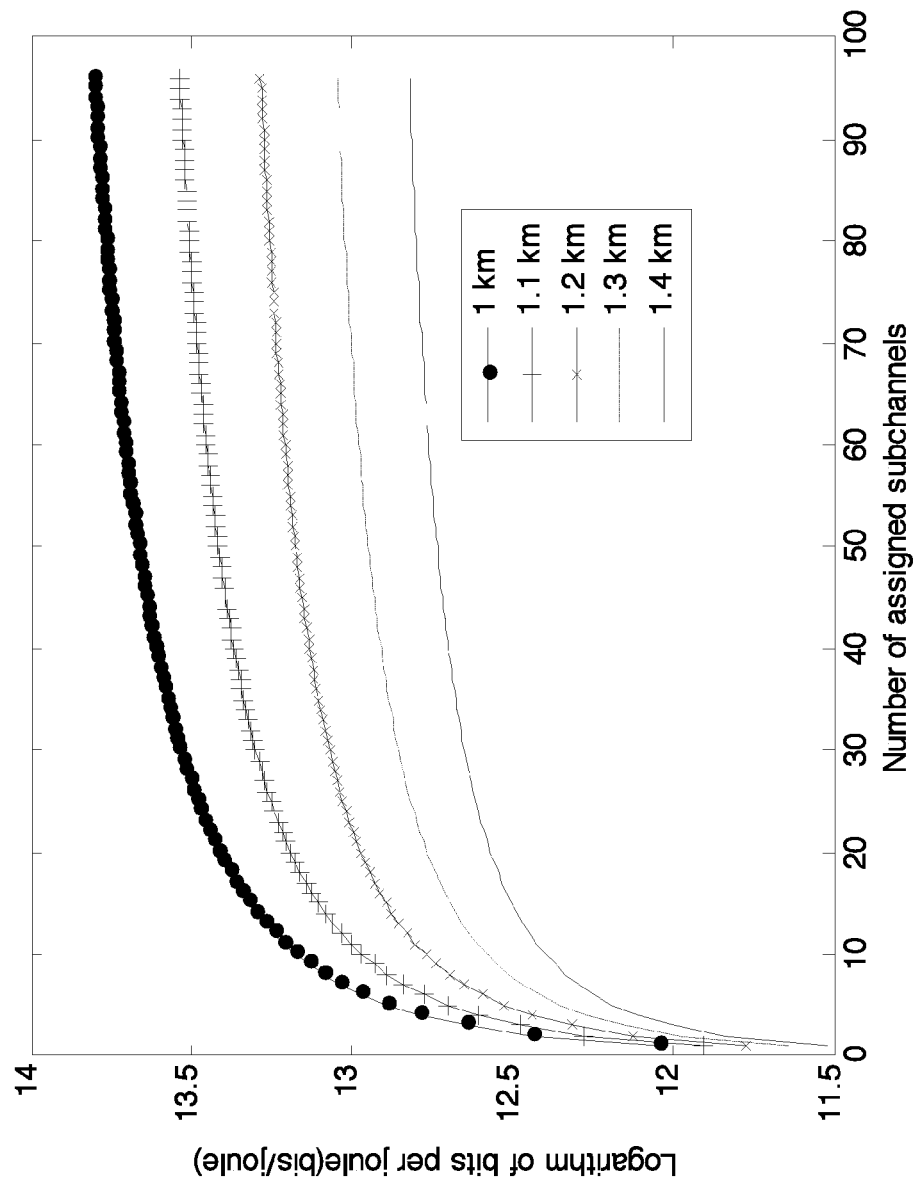

The equations below described the sum-utility and product-utility optimization frameworks, respectively, for determining energy-efficient resource allocations, in some embodiments:

$$U = \operatorname*{argmax}_c \sum_i \frac{R_i}{P_i(R_i)} = \operatorname*{argmax}_c \sum_i U_i(R_i) \quad (2)$$

and $$U = \operatorname*{argmax}_c \prod_i \frac{R_i}{P_i(R_i)} = \operatorname*{argmax}_c \sum_i \log\left(\frac{R_i}{P_i(R_i)}\right) = \operatorname*{argmax}_c \sum_i U_i(R_i) \quad (3)$$

where $U_i$ is the utility function for the $i^{th}$ user, $R_i$ is the transmission rate for the $i^{th}$ user, and $P_i$ is the power consumed for the $i^{th}$ user. The U expression above is trying to maximize the "utility" across users (subscriber stations), measured as "throughput per joule". Therefore, techniques developed for utility-based resource allocation for OFDMA are applicable to energy-aware resource allocation 200 of the LARA framework 100, in some embodiments. The utility functions corresponding to these metrics are computed with optimal transmission rate and power settings for each user, as shown in the graphs 84 and 86 of FIGS. 7A and 7B, respectively, according to some embodiments. The graphs 84 and 86 show the relationship of bits-per-joule capacity versus the number of sub-channels for users (subscriber stations) located 1 kilometer (km), 1.1 km, 1.2 km, 1.3 km, and 1.4 km from the base station. The graph 84 is for energy-aware metrics with fairness while the graph 86 is for energy-aware metrics without fairness.

Reduced-Complexity Utility-Based Resource Allocation Methods

As mentioned earlier, casting the energy-efficient resource allocation problem in terms of a "utility-based" optimization problem allows for the solutions developed for utility-based resource allocation to be directly applied. In some embodiments, the LARA framework 100 includes a low-complexity technique for solving the utility based resource allocation problem, which may potentially reduce the complexity of the energy-efficient resource allocation as well. The following is a brief background of utility-based resource allocation and a description of a proposed low-complexity scheme used by the LARA framework 100.

The data rate per frame of the $i^{th}$ user after allocation is given as:

$$r_i = \sum_{(c,s) \in Q_i} R_i(t, c, s) I(i, t, c, s)$$

where $Q_i$: is the set of quanta (resources) assigned to the $i^{th}$ user, c,s,t are the sub-channel, symbol, and frame indices, respectively, identifying a quantum, $R_i(t,c,s)$ is the rate allocated to the $i^{th}$ user on quantum c,s for frame t, and $I_i(t,c,s)$ is an indicator function which denotes whether sub-channel c in time slot s is allocated to the $i^{th}$ user (value=0, 1).

Each quantum is assigned to only one user such that:

$$Q_i \cap Q_j = 0 \ \forall \ i \neq j \text{ and } \bigcup_i Q_i = Q$$

The objective is to find the optimal scheduling policy, I, satisfying the following equation:

$$I^* = \arg_I \max \sum_i U_i(r_i) \text{ s.t.} \sum_i I(i, t, c, s) = 1$$

where $U'_i(.)$ is the utility function of the $i^{th}$ user.

For the class of concave, continuously differentiable utility functions, the optimal solution is given as:

$$I^* = \arg_I \max \sum_i U'_i(r_i^*) R_i(t, c, s)$$

where $U'_i(.)$ is the derivative of the utility function (also known as the marginal utility function).

It can be seen that achieving the global optimal solution can be complex, as the optimization metric relies on the derivative of the utility function at the total optimal rate allocated to each user in a frame. Hence, the optimal solution must be found by searching over $M^Q$ different possible quanta assignments, where M is the total number of users. Several, sub-optimal solutions are described in the prior art, which yield good performance with cubic complexity. If all utility functions are linear, then the optimal allocation strategy assigns each quantum to the user with the highest $U'_i R_i(t,c,s)$. Here, resource assignment may proceed sequentially, quantum by quantum, as the marginal utility function is constant and no longer a function of the optimal rate per user.

Linear Complexity Utility-Based Resource Allocation

The LARA framework 100 is motivated by the observation that a "linear utility" function leads to a low-complexity "quantum-by-quantum" allocation algorithm that is globally optimal. Hence, in some embodiments, the LARA framework 100 uses a locally linear approximation to any feasible utility function, via a Taylor series expansion. To ignore the higher order terms in the Taylor expansion, the LARA framework 100 ensures that any additional allocation to a user causes only a small perturbation around the current operating point of the expansion. Therefore, in some embodiments, the utility is measured as a function of "average user throughput" rather than as a function of the instantaneous rate assigned to a user. With this assumption, the LARA framework 100 ensures that additional resources allocated to a user for each quantum cause the throughput to change nominally around the current value, allowing for a local linearization of the utility function. It has been shown that measuring overall utility as a function of the average throughput still gives good performance when the instantaneous rate metric is used.

Specifically, the average throughput of the $i^{th}$ user at frame (t+1) can be obtained using an exponentially weighted low-pass filter:

$$T_i(t+1) = \left(1 - \frac{1}{\tau}\right) T_i(t) + \frac{1}{\tau} \sum_{c,s} R_i(t, c, s) I(i, t, c, s) \quad (4)$$

where $T_i$ is the time-averaged throughput of the $i^{th}$ user, $\tau$ is the latency time-scale for averaging, $R_i(t,c,s)$ is the instantaneous rate for the $i^{th}$ user at sub-channel c,s at frame t, and $I(i,t,c,s)$ is the binary "indicator" function, with a value of one indicating that sub-channel c,s at frame t was allocated to user i.

Typically, it may be assumed that $$r = \frac{1}{\tau} \sum_{c,s} R_i(t, c, s) I(i, t, c, s) << \left(1 - \frac{1}{\tau}\right) T_i(t),$$

which is a desirable outcome for the linear approximation to be valid. Now, the optimization problem may be expressed as:

$$I^* = \arg_I \max \sum_i U_i(T_i(t+1)) \text{ s.t.} \sum_i I(i, t, c, s) = 1$$

Using the Taylor series expansion, the following equation results:

$$U_i(T_i(t+1)) = U_i\left(\left(1 - \frac{1}{\tau}\right)T_i(t) + \frac{1}{\tau}\sum_{c,s} R_i(t, c, s)I(i, t, c, s)\right)$$

$$\approx U_i\left(\left(1 - \frac{1}{\tau}\right)T_i(t)\right) + \frac{1}{\tau}\sum_{c,s} R_i(t, c, s)I(i, t, c, s)$$

Hence, the optimization problem thus becomes a one of maximizing the following equations:

$$I^* = \arg_I \max \sum_i U_i'\left(\left(1 - \frac{1}{\tau}\right)T_i(t)\right)R_i(t, c, s)I(i, t, c, s) \quad (5)$$

$$\text{s.t.} \sum_i I(i, t, c, s) = 1$$

Therefore the optimal scheduling policy is simply to allocate sub-channel c in time-slot s to $i^{th}$ user with the largest $$U_i'\left(\left(1 - \frac{1}{\tau}\right)T_i(t)\right)R_i(t, c, s).$$

The approximation will cover a larger class of utility functions for which local linear approximations are possible, and not just concave utility functions. Further, utility functions are defined as a function of average throughput or rate. Other attributes, such as utility as a function of average delay, may be treated in a similar fashion.

In some embodiments, the LARA framework 100 performs locally linear approximation of the utility functions to ensure a linear complexity solution allowing per-quantum resource allocation decisions. This is in contrast to earlier iterative schemes, which had cubic complexity based on the number of quanta and users. Further, the LARA framework 100 measures utility in terms of average system metrics that allow good approximation with locally linearized functions. Finally, the LARA framework 100 applies local linearization to any feasible utility functions, not just concave utility functions.

Example Over-the-Air Protocol for Energy-Efficient Communications

While the LARA framework 100 is applicable for all systems requiring minimum energy resource allocation, the following is a specific embodiment for uplink OFDMA systems.

Figure 8:
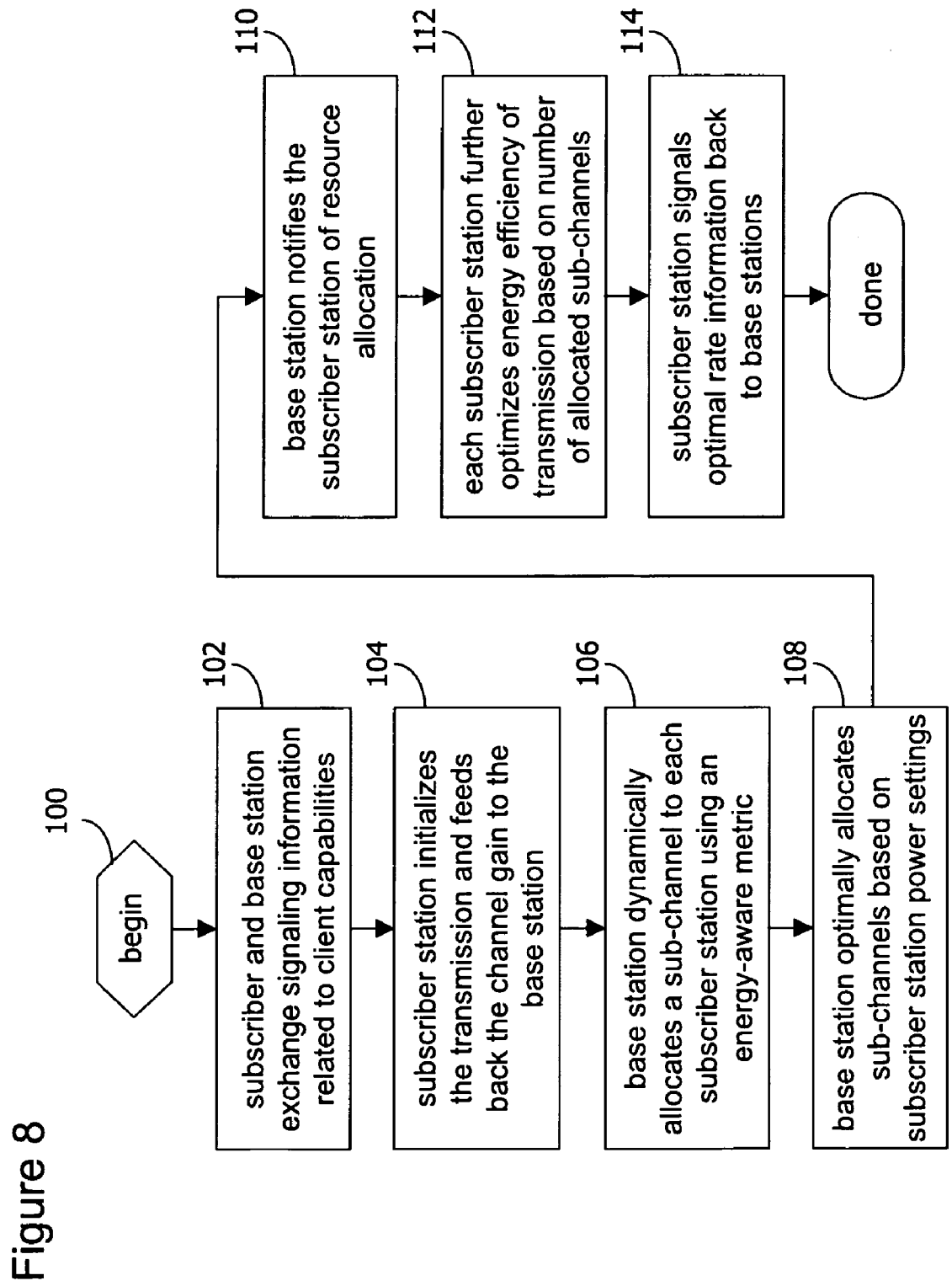
FIG. 8 is a flow diagram depicting operations of the LARA framework of FIG. 1 for enabling resource allocation decisions, according to some embodiments.

FIG. 8 is a flow diagram depicting operations of the LARA framework 100, according to some embodiments, for allocating resources in an OFDMA system. The environment is a wireless neighborhood including multiple base stations and subscriber stations, where the operations of FIG. 8 are performed between a single base station and the subscriber stations supported by the base station.

First, the subscriber station and the base station exchange signaling information related to subscriber station capabilities (block 102). Relevant signaling information may include circuit power consumption, as one example. Upon initialization, the base station becomes aware of the channel gain of each subscriber station. In some embodiments, each subscriber station provides the channel gain information to the base station (block 104). In some embodiments, the channel gain is obtained through time division duplexing (TDD) assumption. This could be a single effective channel gain per frame, such as in partial usage of sub-channels (PUSC), or randomized sub-channel mode, or a set of channel gains per frame, one per OFDMA sub-channel, as in the adaptive modulation coding (AMC) or contiguous sub-channel mode.

Given the transmission capability of each subscriber station, the base station is in charge of the sub-channel assignment to optimize the performance of the overall network. Thus, the base station dynamically allocates sub-channels to each subscriber station using an energy-aware metric (block 106). In some embodiments, the LARA framework 100 uses a sum utility metric as its energy-aware metric, such as is given in equation (2), above. In other embodiments, the LARA framework 100 employs a product utility metric as its energy-aware metric, such as is given in equation (3), above. The LARA framework 100 is thus performing its energy-aware resource allocation 200 (FIG. 1) at this time.

In some embodiments, during resource allocation 200, the base station also optionally performs link adaptation 300, which is also part of the LARA framework 100 (FIG. 1). Based on the power setting of each subscriber station, the base station is able to allocate sub-channels optimally (block 108). In some embodiments, the LARA framework 100 employs the optimum transmission rate equation (1), described above, during sub-channel allocation.

Once a resource allocation decision is made, the subscriber station is notified by the base station (block 110). Each subscriber station further optimizes the energy efficiency of the transmission based on the number of allocated sub-channels (block 112). The subscriber station then signals the optimal rate information back to the base station (block 114).

Network Performance Results

Figure 9A:
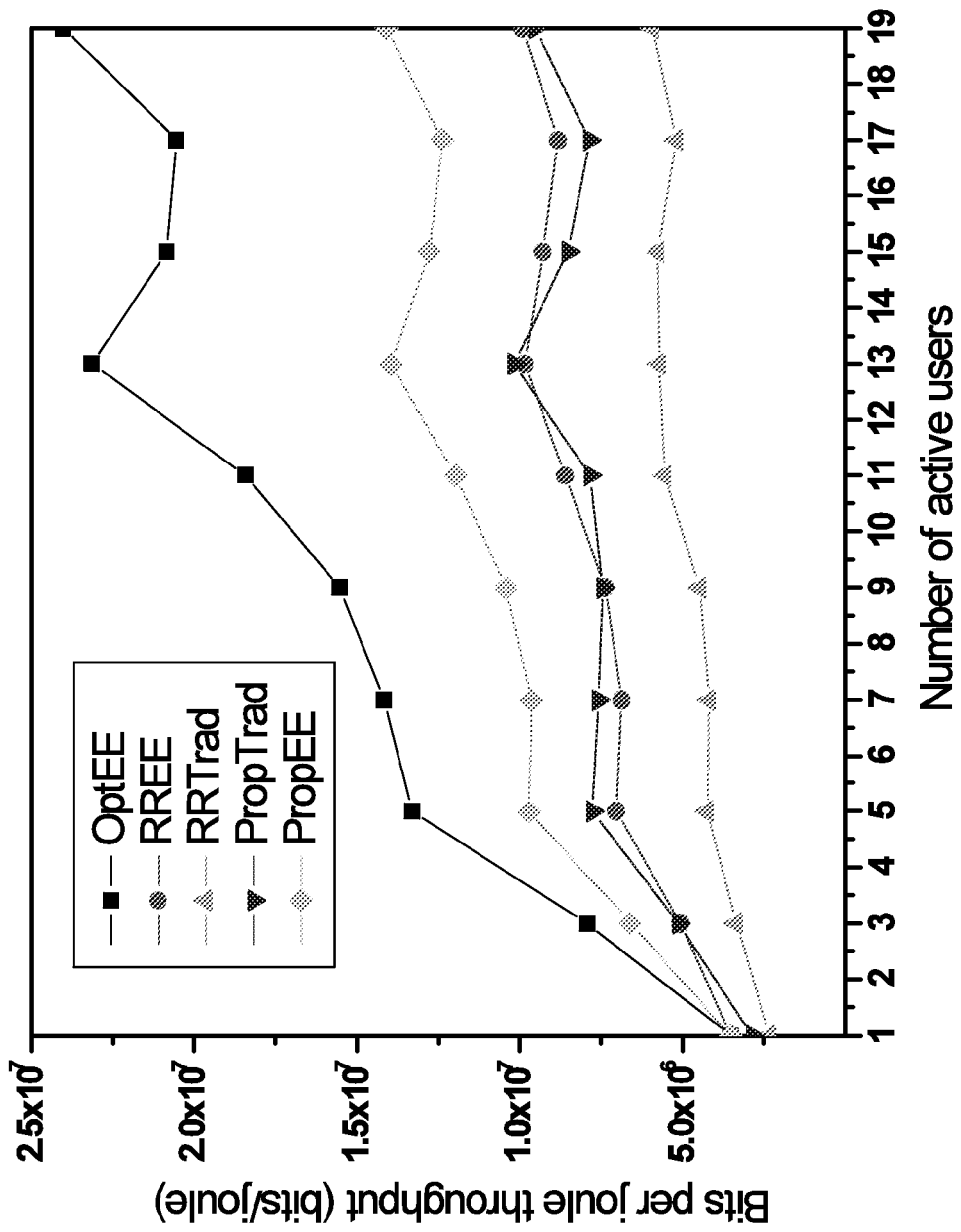
FIGS. 9A and 9B are graphs depicting network throughput per joule as a function of active users, according to some embodiments.
Figure 9B:
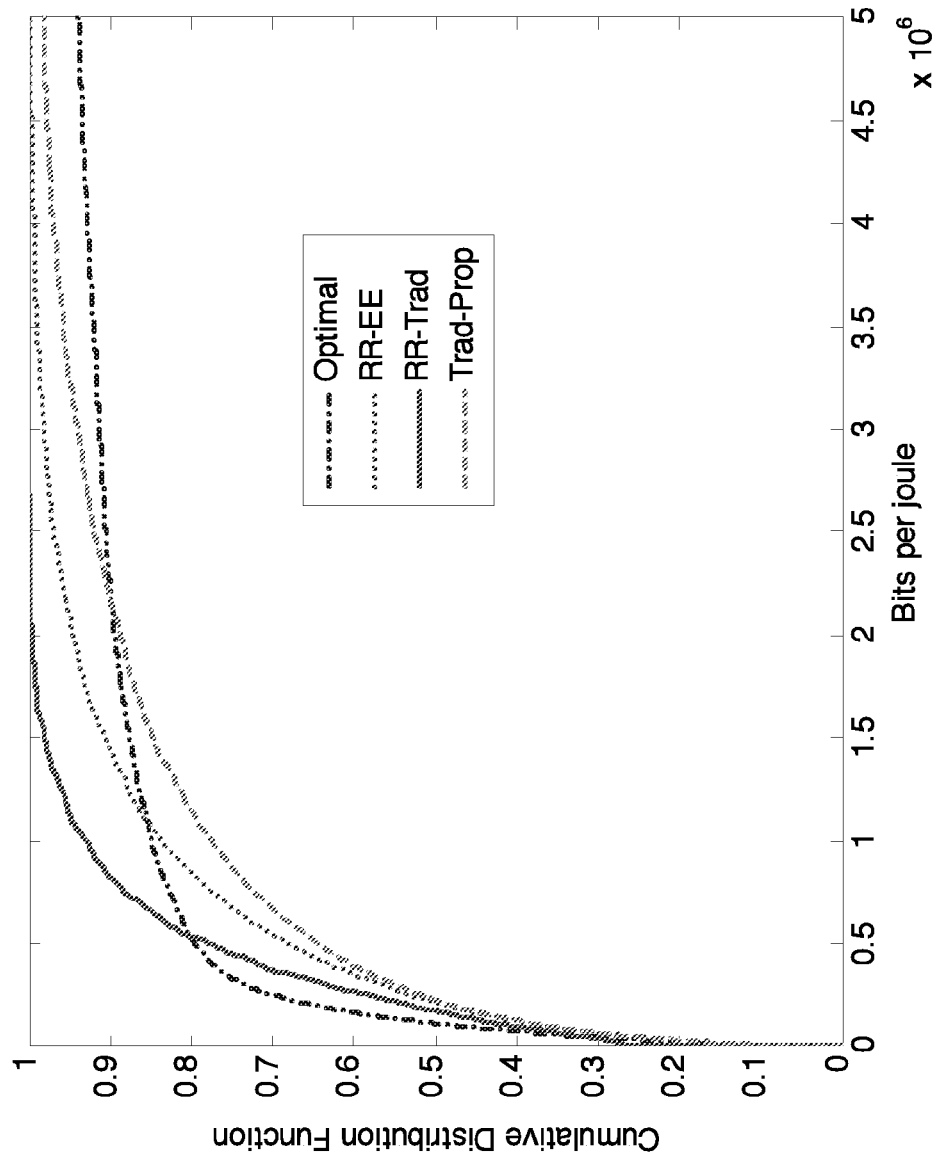

Results for a representative uplink OFDMA system are shown in FIG. 9, according to some embodiments. The graphs 88 and 90 show network throughput per joule as a function of active users. Also plotted is the CDF (cumulative distribution function) of bits-per-joule per user to illustrate the fairness of each scheme. Flat fading OFDMA is assumed, with a transmit power of 15 dBm and a maximum transmit power of 33 dBm.

Figure 10A:
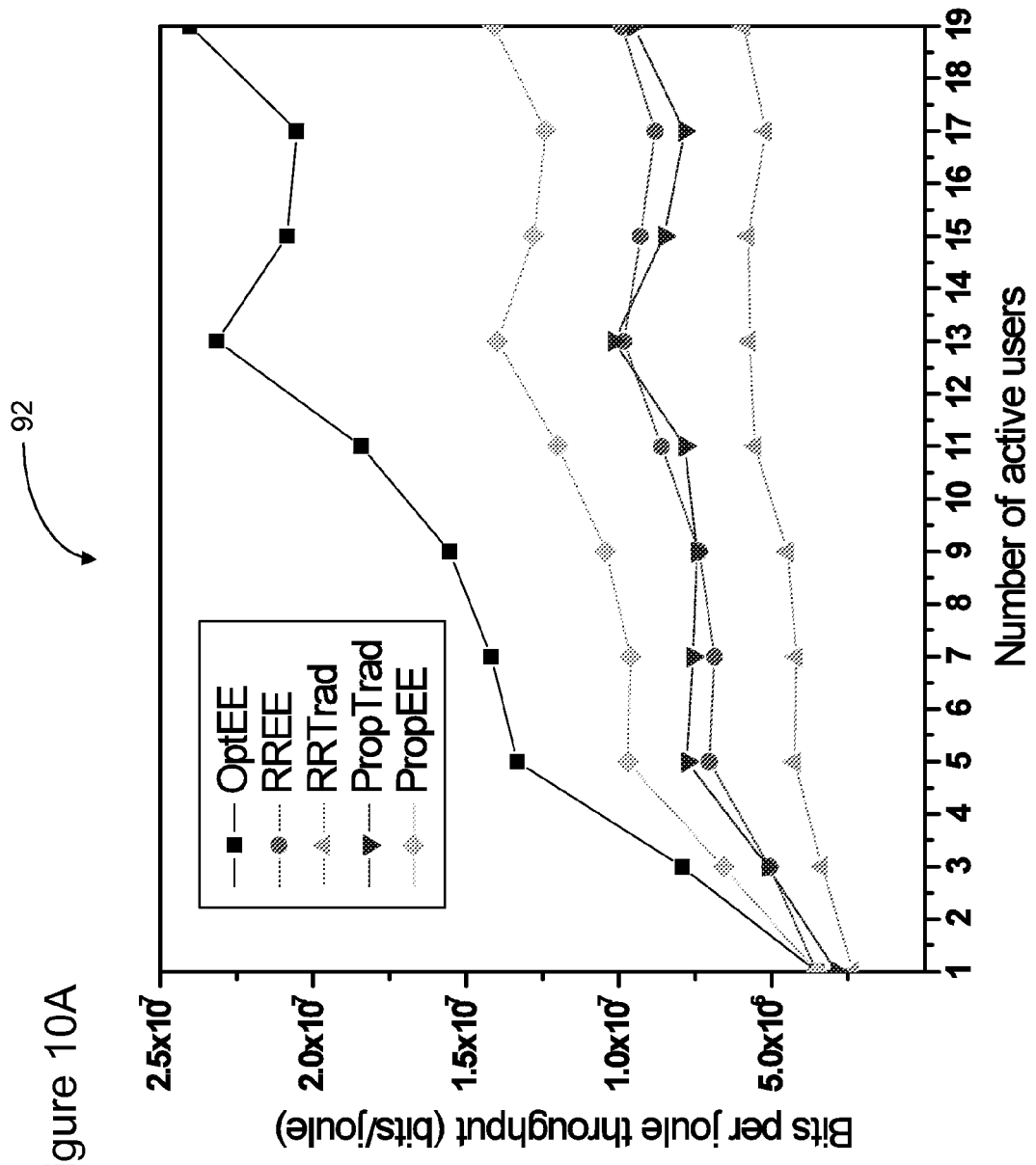
FIGS. 10A and 10B are graphs comparing energy-aware schemes considering both bits-per-joule performance as well as the network throughput performance, according to some embodiments.
Figure 10B:
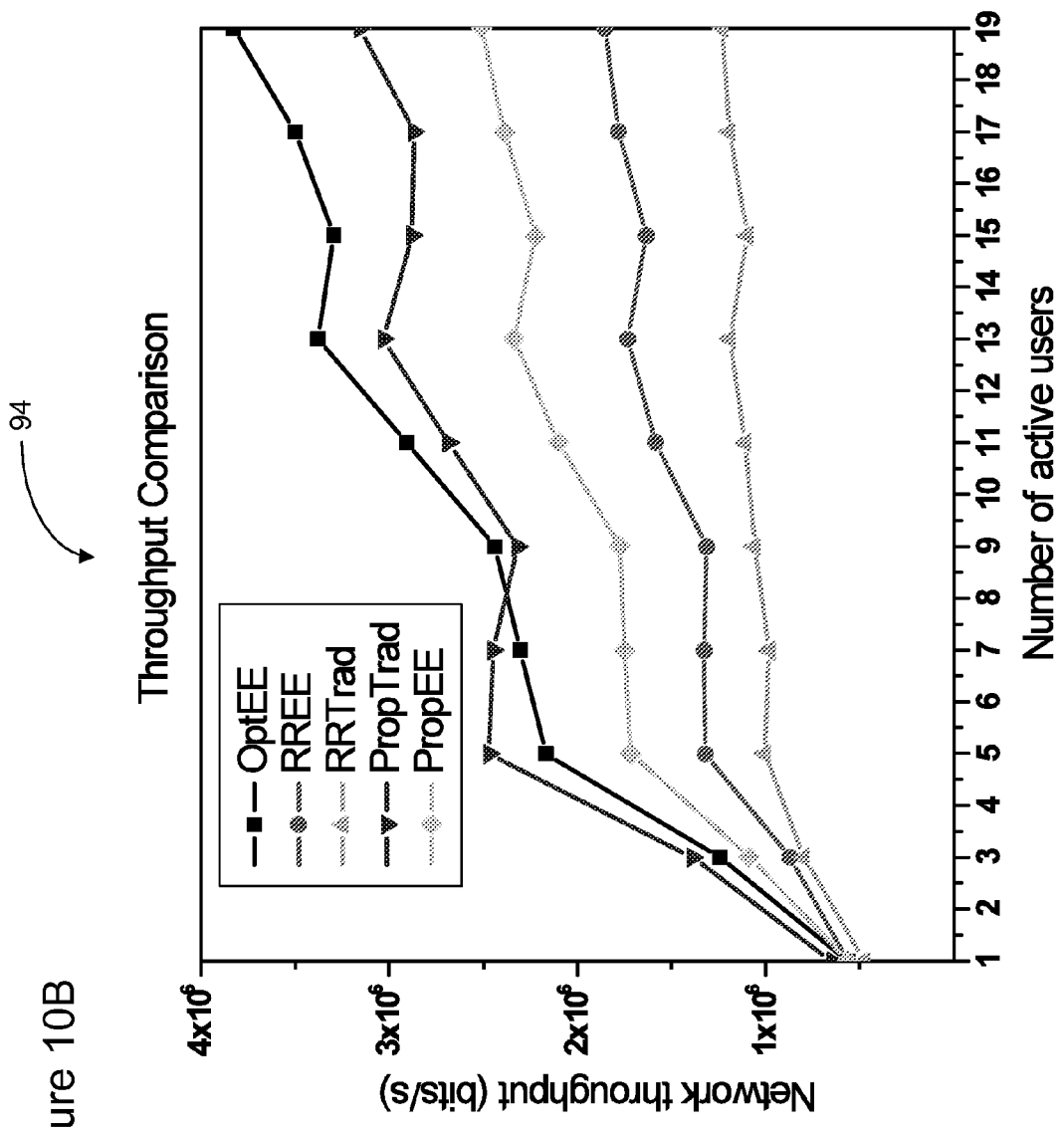

FIGS. 10A and 10B are comparisons of energy aware schemes, considering both bits-per-joule performance as well as the network throughput performance, according to some embodiments. Flat fading OFDMA is assumed with an average transmit power of 15 dBm and a maximum transmit power of 33 dBm.

Figure 11A:
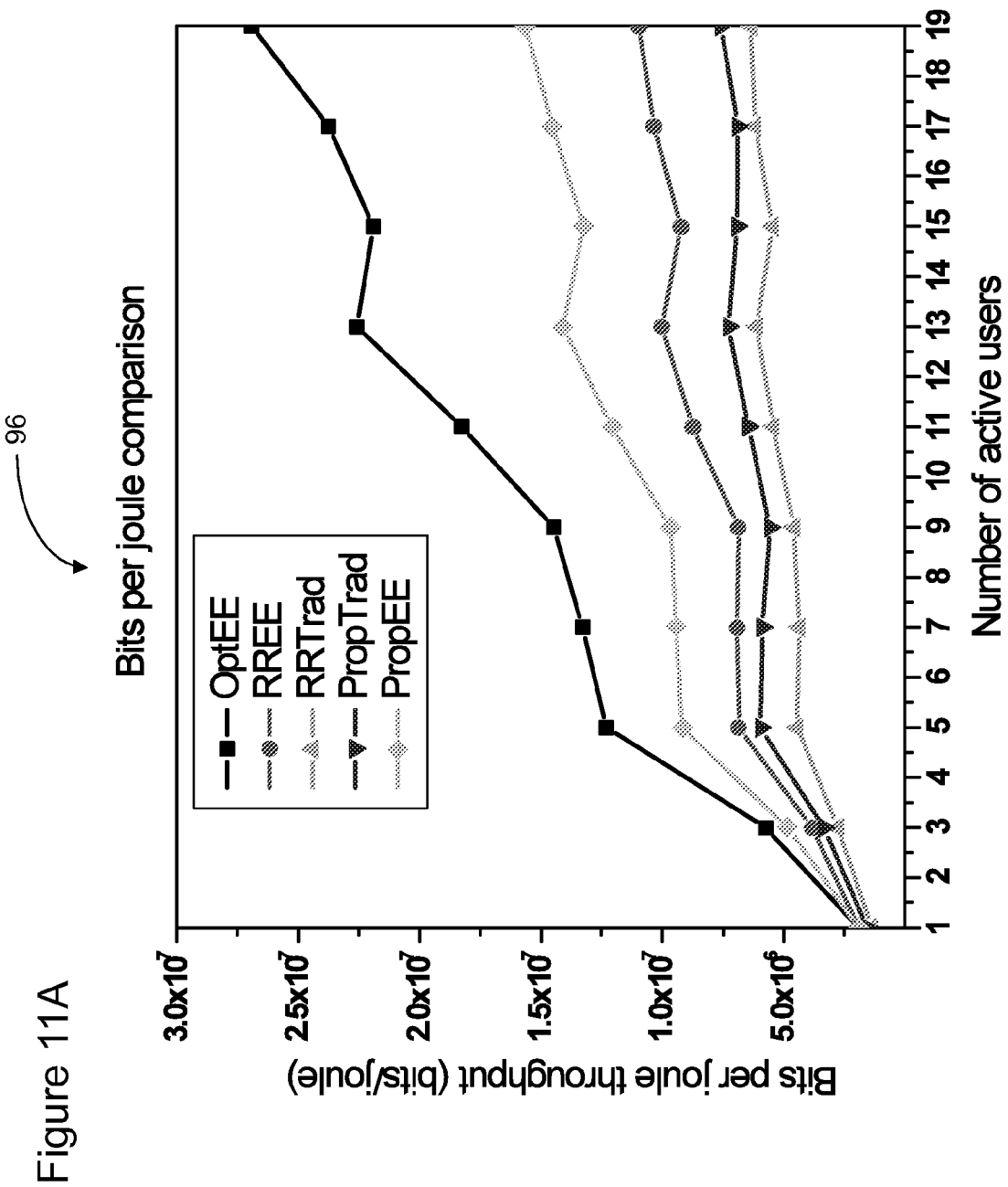
FIGS. 11A and 11B are graphs comparing energy-aware schemes that consider both bits-per-joule performance as well as network throughput performance, according to some embodiments.
Figure 11B:
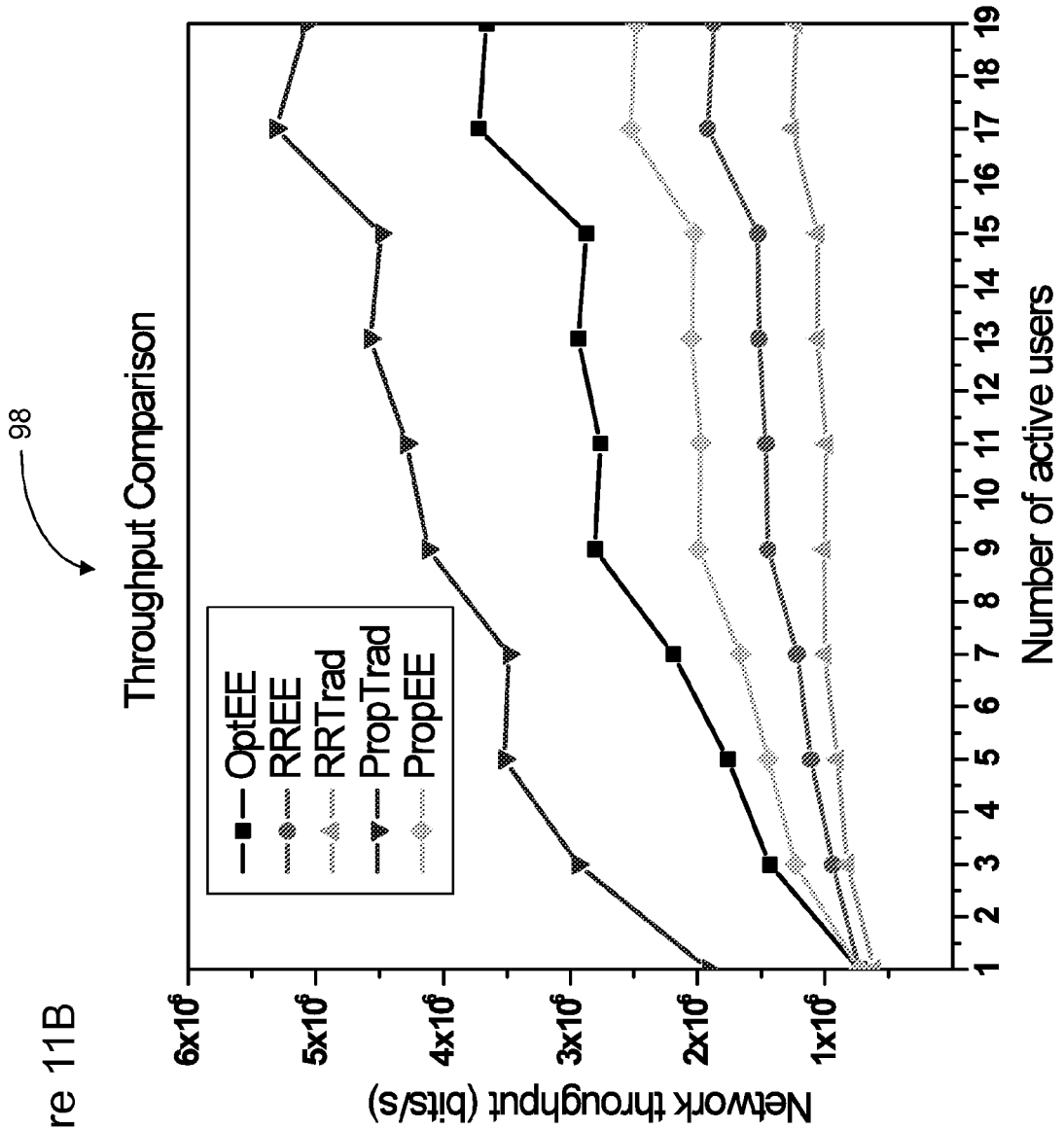

FIGS. 11A and 11B are comparisons of energy aware schemes, considering both bits-per-joule performance as well as the network throughput performance, according to some embodiments. Flat fading OFDMA is assumed with an average transmit power of 33 dBm and a maximum transmit power of 33 dBm. In the graphs 96, 98, it is assumed that OFDMA channel quality may be captured through a single channel quality measurement per OFDMA frame. This is a good approximation for low-mobility flat fading channel or even for a low-mobility, randomized sub-channelization scheme.

Table 1 is a list of assumed scheduling schemes for the LARA framework 100, according to some embodiments.

TABLE 1 assumed scheduling schemes

| | |
|---|---|
| Opt-EE | optimum energy-aware scheduling without fairness |
| prop-EE | optimum energy-aware scheduling with fairness |
| Prop-trad | proportional fairness metric based on maximizing network throughput |

TABLE 1-continued assumed scheduling schemes

| | |
|---|---|
| RR-EE | round-robin scheduling with optimal power settings |
| RR-trad | round-robin scheduling without power-aware link settings |

From the graphs 88, 90, 92, 94, 96, and 98, it can be seen that energy-aware scheduling schemes significantly improve the throughput per joule performance of the system. A gain of 200-700% is observed for the optimal energy-aware scheme when compared to traditional proportional fairness approach. So, if a fixed throughput is assumed, considerable savings in network energy are possible.

It can also be seen that resources are more fairly allocated across users with the proportional fairness, energy-aware scheme when compared to the throughput-per-bit optimal scheme. Furthermore, the loss in the network throughput when compared to schemes optimizing network throughput is dependent on the transmit power can be around 35-50%.

Energy-aware link transmissions and resource allocation can lower the battery power required for wireless communications in the active mode. Thus far, resource allocation and link adaptation schemes for wireless OFDMA systems have focused on maximizing the overall throughput in the system with out focusing on optimizing energy consumption. In some embodiments, the LARA framework 100 significantly reduces the energy consumption of OFDMA-based wireless networks.

In some embodiments, by employing the techniques of the LARA framework 100, a significant improvement in the battery life of systems may occur. Further, execution of the LARA framework 100 results in an advantage for WiMax deployments by providing for a more energy-efficient network operation.

While the application has been described with respect to a limited number of embodiments, those skilled in the art will appreciate numerous modifications and variations therefrom. It is intended that the appended claims cover all such modifications and variations as fall with in the true spirit and scope of the disclosed subject matter.

We claim:

1. A method, comprising:
exchanging signaling information with a base station in an orthogonal frequency division multiple access network;
feeding back a channel gain to the base station after transmission;
receiving an allocation comprising one or more sub-channels from the base station using throughput-per-joule metrics, wherein the allocation reduces energy usage and the throughput-per-joule metrics uses either the following sum-utility metric:

$$U = \arg\max_c \sum_i \frac{R_i}{P_i(R_i)} = \arg\max_c \sum_i U_i(R_i)$$

or using the following product-utility metric:

$$U = \arg\max_c \prod_i \frac{R_i}{P_i(R_i)} = \arg\max_c \sum_i \log\left(\frac{R_i}{P_i(R_i)}\right) = \arg\max_c \sum_i U_i(R_i)$$

wherein $U_i$ is the utility function for the $i^{th}$ user, $R_i$ is the transmission rate for the $i^{th}$ user, and $P_i$ is the power consumed for the $i^{th}$ user; and
transmitting to the base station based on the allocation using throughput-per-joule metrics.

2. The method of claim 1, further comprising:
signaling optimal rate information to the base station.

3. The method of claim 1, further comprising:
transmitting circuit power consumption to the base station.

4. The method of claim 3,
wherein the allocation is additionally based on circuit power consumption.

5. The method of claim 1, feeding back a channel gain to the base station after transmission further comprising:
obtaining the channel gain using time division duplexing assumption.

6. A method, comprising:
receiving signaling information from subscriber stations in an orthogonal frequency division multiple access network;
receiving channel gain information from the subscriber stations;
dynamically allocating sub-channels to each subscriber station using throughput-per-joule metrics to allocate sub-channels within the network to reduce energy usage of subscriber stations that use the sub-channels, the throughput-per-joule metrics further comprising either a sum-utility metric or a product-utility metric to allocate sub-channels, wherein the sum-utility metric is:

$$U = \arg\max_c \sum_i \frac{R_i}{P_i(R_i)} = \arg\max_c \sum_i U_i(R_i)$$

and the product utility metric is:

$$U = \arg\max_c \prod_i \frac{R_i}{P_i(R_i)} = \arg\max_c \sum_i \log\left(\frac{R_i}{P_i(R_i)}\right) = \arg\max_c \sum_i U_i(R_i)$$

wherein $U_i$ is the utility function for the $i^{th}$ user, $R_i$ is the transmission rate for the $i^{th}$ user, and $P_i$ is the power consumed for the $i^{th}$ user; and
transmitting to each subscriber station the sub-channel allocation based upon the throughput-per-joule metrics.

7. The method of claim 6, further comprising:
receiving optimal rate information from the subscriber stations;
receiving power settings from the subscriber stations; and
allocating one or more sub-channels to each subscriber station based on both the energy usage reduction and on the received power settings.

8. The method of claim 6, receiving signaling information from subscriber stations further comprising:
receiving circuit power consumption of each subscriber station from each subscriber station.

9. The method of claim 6, receiving channel gain information from the subscriber stations further comprising:
receiving effective channel gain per frame from each subscriber station.

10. The method of claim 6, receiving channel gain information from the subscriber stations further comprising:
receiving a set of channel gains per frame from each subscriber station.

11. A link adaptation and resource allocation method for use in an orthogonal frequency division multiple access network, the method comprising:

performing energy-aware resource allocation to allocate sub-channels to users in the network based on channel gain received from the users;

using either a sum-utility metric or a product-utility metric to allocate sub-channels to the user;

simplifying the sum-utility metric or the product-utility metric to a linear approximation function, wherein the linear approximation function is used to allocate sub-channels to the user, the linear approximation function comprising:

$$I^* = \arg_I \max \sum_i U_i' \left(\left(1 - \frac{1}{\tau}\right) T_i(t)\right) R_i(t, c, s) I(i, t, c, s)$$

$$\text{s.t.} \sum_i I(i, t, c, s) = 1$$

wherein $U'_i$ is the derivative of a utility function U, $R_i(t,c,s)$ is an instantaneous rate for user i, at sub-channels, c, s at frame t, and $I(i,t,c,s)$ is a binary indicator function, with a value of one indicating that sub-channel c,s at frame t was allocated to user I;

performing energy-efficient link adaptation to determine an optimum transmission rate for a user of the network based on both circuit power and transmit power of the user, the energy-efficient link adaptation further comprising:

calculating an optimum transmission rate using the following formula:

$$R^* = \arg\min_R E(R) = \arg\min_R \frac{P(R)}{R} = \arg\min_R \frac{P_c + P_T(R)}{R}$$

where R denotes a transmission rate, E(R) is energy consumed at the transmission rate, P(R) is power consumed at the transmission rate, $P_C$ is electronic power consumed, and $P_T(R)$ is transmit power at transmission rate, R; and transmitting at the optimum transmission rate based on the sub-channels allocated using either the sum-utility metric or the product-utility metric.

* * * * *